2 Sheets—Sheet 1.

J. LAMPERT.
Chop-Separator and Bran-Cleaner.

No. 226,234. Patented April 6, 1880.

WITNESSES
William Zimmerman
H. H. Abbott

INVENTOR
Jacob Lampert
By Gridley & Co.
Attys.

J. LAMPERT.
Chop-Separator and Bran-Cleaner.
No. 226,234. Patented April 6, 1880.
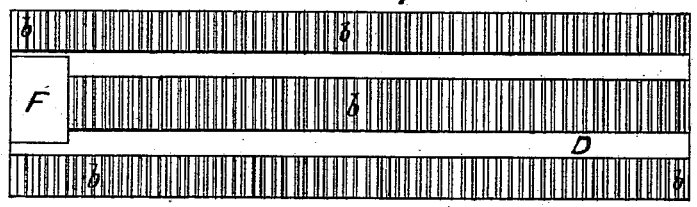
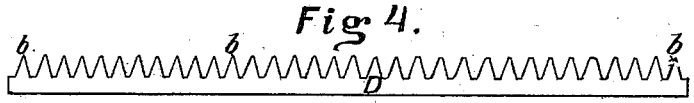
WITNESSES. INVENTOR.

UNITED STATES PATENT OFFICE.

JACOB LAMPERT, OF STEVENS POINT, WISCONSIN.

CHOP-SEPARATOR AND BRAN-CLEANER.

SPECIFICATION forming part of Letters Patent No. 226,234, dated April 6, 1880.

Application filed December 9, 1879.

*To all whom it may concern:*

Be it known that I, JACOB LAMPERT, of Stevens Point, in the county of Portage and State of Wisconsin, have invented a new, useful, and Improved Chop-Separator and Bran-Cleaner; and I hereby declare the following to be a full, clear, and exact description thereof, which will enable others skilled in the art to which my invention appertains to make and use the same, reference being had to the accompanying drawings, forming a part hereof, and in which—

Figure 1:
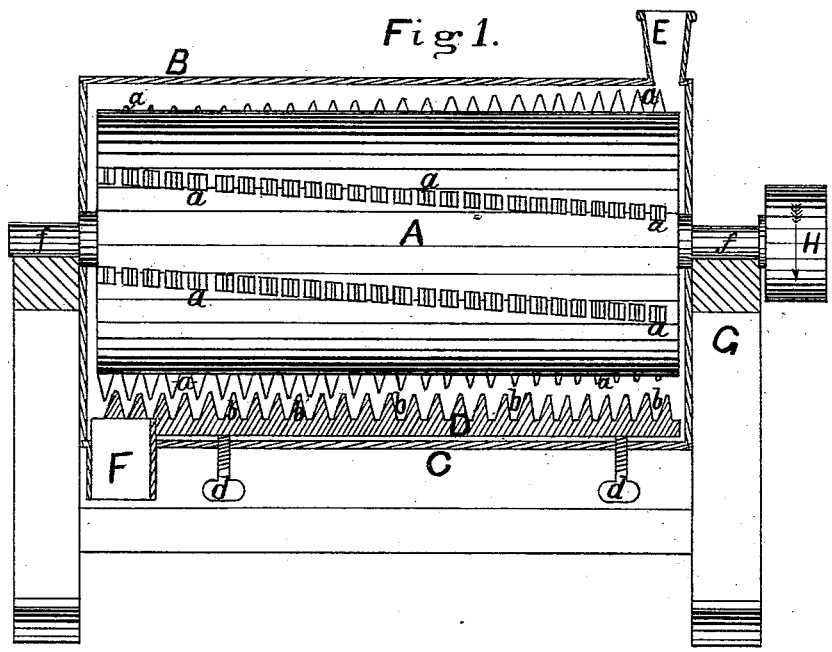
Figure 2:
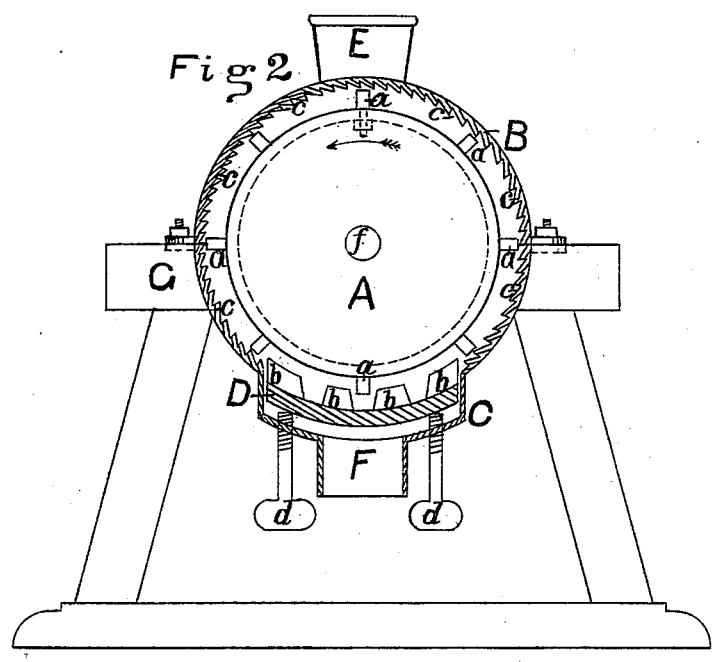

Figure 1 represents a side elevation, partly in section, of my improved chop-separator and bran-cleaner. Fig. 2 represents an end elevation of the same with the end of the cylindrical casing and frame removed. Fig. 3 represents a plan view, Fig. 4 a side elevation, and Fig. 5 an end view, of the concave.

Like letters of reference indicate like parts.

In the new process of manufacturing flour from wheat, the wheat is first cleaned or scoured, then crushed by being passed between rollers, and the product or chop is then bolted in the usual manner for the purpose of separating the superfine flour and middlings from the germ and bran; but in consequence of the flattened condition of the wheat after passing between the rollers a complete separation of the flour and middlings from the germ and bran is not accomplished by the first bolting, and consequently the tailings are again and again passed through the rollers and bolts.

The object of my invention is to facilitate the bolting of the chop from the crushed wheat, and thereby more quickly, and with less operations of crushing and bolting, separate the flour and middlings from the germ and bran by disintegrating or separating the several parts of the crushed wheat after passing through the rollers, and also to thoroughly clean the bran of adhering particles of flour.

In the drawings, G represents the frame, which may be made of wood or metal, and of any shape or form that will receive and support the operating parts.

Mounted upon the frame G is a shaft, $f$, upon which is rigidly mounted a hollow metal cylinder, A, preferably of steel. To one end of the shaft is securely attached a driving-pulley, H, to which and the cylinder a rotary motion is imparted by means of a belt (not shown) connected with any suitable motor.

Upon the periphery of the cylinder are arranged in parallel spiral rows, and within suitable perforations previously made for that purpose, a series of square-cornered wedge-shaped teeth, $a$, at intervals of about one and a quarter inch from the center of each tooth, and each of which is held in place by means of a nut screwed upon the base thereof, and bearing against the inner surface of the cylinder.

The cylinder A is surrounded by a metal casing, B, serrated upon its inner surface longitudinally with teeth $a$ of the entire length of the casing, the saw-like points of which project inward against the direction of motion of the cylinder. The upper half of the casing B forms the cover or lid, as shown in the drawings.

On the under side of the cylinder the casing B is extended downward, so as to form a chamber or recess, C, into which is placed an adjustable metal concave, D, provided with wedge-shaped teeth $b$, which are so arranged as to allow the teeth of the cylinder to pass between the teeth $b$ of the concave, and are of about the same height as the teeth upon the cylinder, and their length across the concave may be varied to such proportions as may be desired.

In Fig. 2 four rows are shown, and in Figs. 3 and 5 three rows are shown, and they may be cast with and form an integral part of the concave, or the teeth may be made like those of the cylinder, and bolted thereto in the same manner.

The object of placing the teeth spirally to the line of the axis along the surface of the cylinder A is to cause the chop to gradually move along from the hopper E to the discharge at F, and for this purpose the rows of teeth may be set more or less spirally, as the nature of the work may demand, as the more spirally the rows of teeth are set the quicker the chop will pass through, while, on the other hand, the longer it is retained the more it becomes beaten and disintegrated.

Through the bottom of the chamber C are passed four set-screws, $d\ d\ d\ d$, by means of which the concave D may be raised or lowered to any desired degree, so as to cause the teeth of the concave to mesh more or less closely with those of the cylinder, according to the kind of work desired.

The operation of my improved chop-separator and bran-cleaner is as follows: After the wheat has been crushed by being passed through rollers, the product or chop is spouted into the hopper E and falls upon the cylinder, when it is thrown by the rotary motion of the cylinder against the serrations upon the inner walls of the case B and partly broken and separated, and from thence falls into the concave, where the several parts of the chop or meal are more thoroughly disintegrated or separated by the meshing of the teeth upon the cylinder between those in the concave and the consequent rubbing and tearing action thereof upon the chop or meal as it passes through the machine, and from thence is discharged through spout F, when it is elevated or carried to the bolts in the usual manner. After the bran has been separated from the flour, middlings, and germ, and in the event of particles of flour adhering thereto, it is returned to one of the aforesaid machines for the purpose of cleaning the bran of any adhering particles of flour, and when the machine is so used the concave is raised or adjusted so that the teeth upon the cylinder mesh close between the teeth in the concave.

Having thus described my invention, what I claim as new, and desire to secure by Letters Patent, is—

The combination, with the rotary cylinder A, provided with a series of spirally-arranged and wedge-shaped teeth, $a$, and the concave D, provided with a series of corresponding wedge-shaped teeth, of the case B, provided with serrations $c$ upon the inner surface thereof, and spouts E and F, substantially as shown and described.

JACOB LAMPERT.

Witnesses:
 B. LAMPERT,
 WILLIAM ZIMMERMAN.